United States Patent
Alberti

(10) Patent No.: US 7,343,156 B2
(45) Date of Patent: Mar. 11, 2008

(54) METHOD FOR LOGGING ON A PORTABLE PART AT A BASE STATION AND BASE STATION FOR CARRYING OUT THE METHOD

(75) Inventor: Mathaeus Alberti, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 263 days.

(21) Appl. No.: 10/343,574

(22) PCT Filed: Jun. 25, 2001

(86) PCT No.: PCT/DE01/02326

§ 371 (c)(1),
(2), (4) Date: Jan. 31, 2003

(87) PCT Pub. No.: WO02/11481

PCT Pub. Date: Feb. 7, 2002

(65) Prior Publication Data

US 2004/0048626 A1    Mar. 11, 2004

(30) Foreign Application Priority Data

Jul. 31, 2000   (DE) ............................. 100 37 295

(51) Int. Cl.
*H04Q 7/20* (2006.01)

(52) U.S. Cl. .................. 455/424; 455/405; 455/407; 455/408; 455/423; 379/413; 379/322; 379/279; 379/323

(58) Field of Classification Search ............... 455/561, 455/33.1, 11.1, 435.1, 424, 405, 407, 408, 455/423, 411; 379/413, 322, 279, 323
See application file for complete search history.

(56) References Cited

U.S. PATENT DOCUMENTS 5,812,955 A * 9/1998 Dent et al. .................. 455/561

FOREIGN PATENT DOCUMENTS

| DE | 197 40 934 | 4/1999 |
| EP | 0869693 | 10/1998 |
| EP | 0902598 | 3/1999 |
| EP | 1002376 | 5/2000 |

* cited by examiner

*Primary Examiner*—Joseph Feild
*Assistant Examiner*—Randy Peaches
(74) *Attorney, Agent, or Firm*—Bell, Boyd & Lloyd LLP

(57) ABSTRACT

A method, and base station, are provided for logging on a portable part at a base station having activating capabilities for more than a single associated portable part, wherein the base station, before a log-on mode is actually switched on, performs a check for an operable connection from the base station to a telecommunication network and, if the check has a positive result, the log-on mode is kept switched off by the base station.

2 Claims, 1 Drawing Sheet

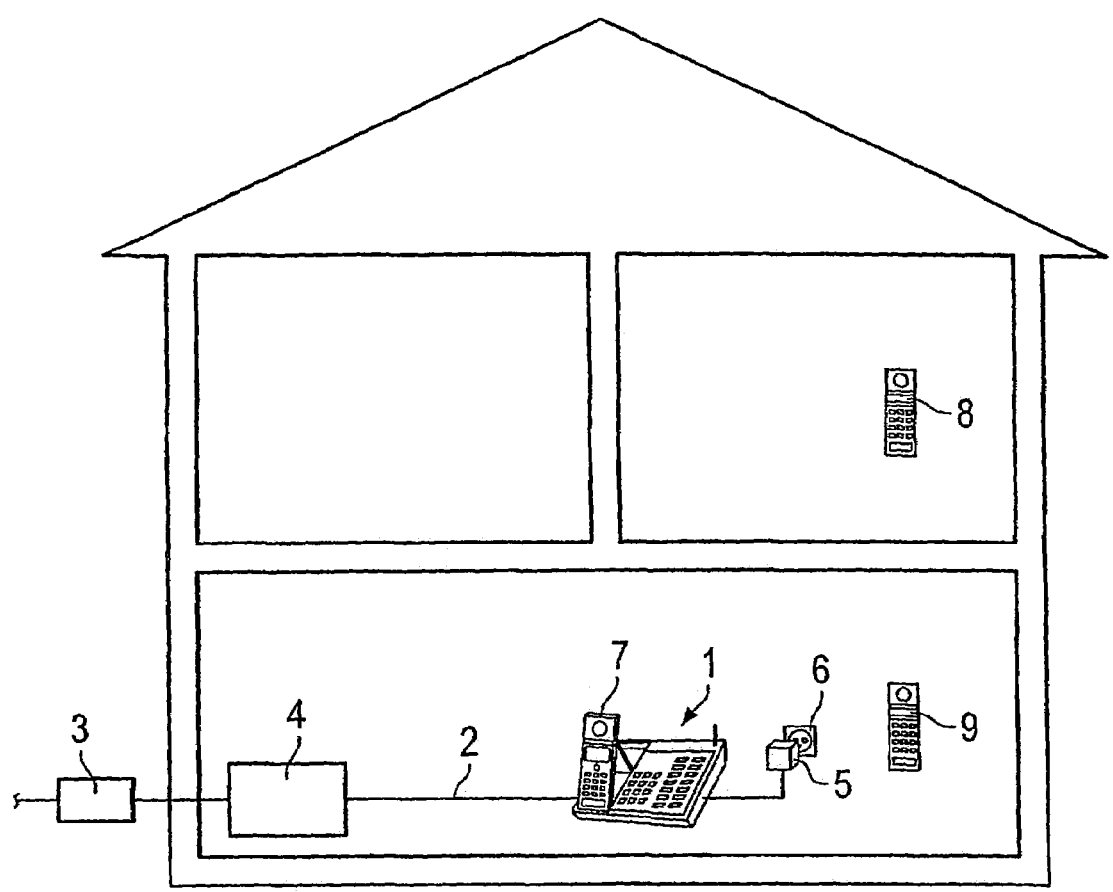

METHOD FOR LOGGING ON A PORTABLE PART AT A BASE STATION AND BASE STATION FOR CARRYING OUT THE METHOD

BACKGROUND OF THE INVENTION

For the logging on of a portable part at a so-called DECT (Digital Enhanced Cordless Telecommunications) base station which is capable of simultaneously controlling more than only one single associated portable part, the base station must be placed into a log-on mode. During the log-on mode, which is switched on for only a limited period for safety reasons, the base station is capable of accepting measures for logging on a portable part and of accepting the log-on of the portable part.

Today, base stations are known, for example by Hagenuk, which switch to the log-on mode when a supply voltage for the base station is newly applied or the supply voltage is applied again to the base station after previous elimination of the supply voltage.

This method makes it possible to manufacture base stations without a separate key especially for switching on the log-on mode.

The disadvantageous factor in such a method for logging on portable parts at a base station is that, in principle, it is possible to produce a short-time failure of the supply voltage of the base station without access to the area in which the base station is set up, and then to log on an outside portable part remote from the base station at the base station during the period of the log-on mode.

In this manner, it would be possible to telephone at someone else's cost. The failure of the supply voltage of the base station could be produced illegally by operating the corresponding fuses for a short time; for example, in the case of rented apartments with a fuse box mounted in the common stairwell.

Starting with a method or a base station of the type initially mentioned, it is an object of the present invention to improve the method or the base station, respectively, in such a manner that an unintended or improper log-on of an outside portable part at a base station is prevented.

SUMMARY OF THE INVENTION

Both in the method and in the base station for carrying out the method, the approach to the solution consists in safeguarding the log-on mode of the base station with a connection to a telecommunication network in such a manner that a log-on is only possible if a check for an operable connection from the base station to a telecommunication network before the actual switch-on of the log-on mode has the result that there is no such connection.

In an advantageous embodiment of the present invention, this circumstance is also combined with the circumstance that a supply voltage for the base station is newly applied or applied again to the base station after previous elimination of the supply voltage.

The term telecommunication network shall also include network designations such as telecommunication network, post-office network and/or land line network.

Once a base station is installed, it is connected both to a telecommunication network and to a supply voltage. The base station is also still connected to the telecommunication network if the supply voltage fails intentionally or unintentionally. The telecommunication network is operating independently of the supply voltage to the base station. It has its own power supply. An existing operable telecommunication connection exists and operates, therefore, even when the supply voltage to the base station is applied again. If a log-on of a portable part at the base station is required, the authorized user of the base station can deliberately separate the connection to the telecommunication network before again connecting the supply voltage. To achieve this, an unauthorized person would have to actually penetrate into the area close to the base station. As a rule, therefore, he/she would have to violate existing apartment boundaries or the like.

It is highly improbable that the case occurs where simultaneously, on the one hand, a return of the power supply to the relevant base station after a power interruption and, on the other hand, a failure of the telecommunication network at this base station can happen at this time and, in addition, an unauthorized person wishes to register an outside portable part at the relevant base station at the same time. This is already improbable because a telecommunication network, per se, is implemented to be very reliable. Moreover, an unauthorized person has virtually no possibility of influencing the operability of the telecommunication network from the outside.

Overall, the fact that the connection to a telecommunication network continues to exist even in the case of a power failure effectively prevents any external manipulation or unintended false log-on after a power failure without requiring a separate key for manually switching the base station into a log-on mode. Security is, thus, guaranteed in the same way as when a key is used. The operation of the key is replaced by a suitable interrogation at a suitable time.

Additional features and advantages of the present invention are described in, and will be apparent from, the following Detailed Description of the Invention and the Figures.

BRIEF DESCRIPTION OF THE FIGURES

FIG. 1 shows a house in which a DECT base station 1 is installed.

DETAILED DESCRIPTION OF THE INVENTION

As shown in FIG. 1, the DECT base station 1 is connected to a telecommunication network 2 which is represented combined by a component 3 toward the outside. In the present exemplary embodiment, the telecommunication network 2 is an ISDN network of the Post Office. The DECT base station 1 is connected via an ISDN input 4. The DECT base station 1 is connected to a power system 6 via a power supply 5. The DECT base station 1 is supplied with power via the power system 6. According to the exemplary embodiment, two portable parts 7, 8 are already logged on at the DECT base station 1. A portable part 9 is subsequently logged on in accordance with the following steps.

To log the portable part 9 on at the DECT base station 1, both the connection to the telecommunication network 2 and to the power supply connection to the power system 6 are disconnected. The disconnection is done simply by pulling corresponding plugs. With respect to the power system, the power supply 5 constructed as a plug is pulled out of the socket belonging to the power system 6.

Once the connections to the telecommunication network 2 and to the power system 6 have been interrupted, the connection to the power system 6 is restored. The DECT base station 1 is, thus, again supplied with power. The DECT base station 1 is switched on. In this process, the DECT base station 1 runs through various software routines. One of the software routines is used for checking whether there is an operative connection to a telecommunication network 2. This can be done by attempting to set up a connection to the outside. Since the connection to the telecommunication network 2 has been broken, the result of this check will be negative. The DECT base station 1, therefore, assumes that a short-time power interruption has been deliberately produced in order to log a portable part on at the DECT base station 1. The DECT base station 1, therefore, switches to a log-on mode for a predetermined period of time. Once the DECT base station 1 is in the log-on mode, the logging-on process can be carried out by the portable part to be logged on; in the present case, the portable part 9. As a rule, the logging-on process includes various measures which are especially specified in the product description for the portable part 9. Once the logging-on process has been concluded, the DECT base station 1 goes into its operating mode. If, finally, the connection to the telecommunication network 2 is also restored again, the portable part 9 can be used for telephoning by using the DECT base station 1 from now on.

Although the present invention has been described with reference to specific embodiments, those of skill in the art will recognize that changes may be made thereto without departing from the spirit and scope of the present invention as set forth in the hereafter appended claims.

The invention claimed is:

1. A method for securely logging on a portable part at a base station for activating a plurality of authorized portable parts, the method comprising the steps of:
  registering the authorized portable parts at the base station to create an authorized group;
  remotely interrupting power to the base station momentarily to induce a log-on mode in the base station, wherein the remote interruption breaks a connection between the base station and a telecommunication network;
  monitoring a log-on mode of at least one of the registered portable parts to confirm that a log-on mode is off;
  performing, via the base station, a check for an operable communication connection from the base station to a telecommunication network if the log-on mode is off;
  initiating a log-on procedure wherein the log-on mode is initially kept switched off by the base station if the check has a positive result;
  continuing the log-on procedure by switching the log-on mode on for a predetermined period of time in the base station after the interruption of the power has occurred, wherein the at least one of the registered portable parts is allowed to log on during the predetermined period of time as a member of the registered group; and
  switching the base station into an operating mode after the predetermined period of time has expired.

2. A base station for securely logging on a portable part at the base station, the base for activating a plurality of authorized portable parts, the base station comprising:
  parts for registering the authorized portable parts at the base station to create an authorized group;
  a power input, wherein power is remotely interrupted momentarily to induce a log-on mode in the base station, wherein the remote interruption breaks a communication connection between the base station and a telecommunication network;
  parts monitoring a log-on mode of at least one of the registered portable parts to confirm that a log-on mode is off;
  parts that check for an operable communication connection from the base station to a telecommunication network if the log-on mode is off;
  parts for performing a log-on procedure, comprising:
    parts for initiating a log-on procedure wherein the log-on mode is initially kept switched off by the base station if the check has a positive result;
    parts for completing the log-on procedure by switching the log-on mode on for a predetermined period of time in the base station after the interruption of the power has occurred, wherein the at least one of the registered portable parts is allowed to log on during the predetermined period of time as a member of the registered group; and
  switching the base station into an operating mode after the predetermined period of time has expired.

* * * * *